(12) United States Patent
Hazard et al.

(10) Patent No.: US 12,052,265 B1
(45) Date of Patent: Jul. 30, 2024

(54) GENERATING RESOURCES BASED ON TIMESTAMPS

(71) Applicant: Citibank, N.A., New York, NY (US)

(72) Inventors: Rob Hazard, Sioux Falls, SD (US); Pete D'Aleo, New York, NY (US); Jaclyn Campanella, Wilmington, DE (US); Camilo Restrepo Montoya, New York, NY (US); Lisa Giordanella, New York, NY (US); Jim Horn, Sioux Falls, SD (US); Chris Amundson, Sioux Falls, SD (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 18/510,316

(22) Filed: Nov. 15, 2023

(51) Int. Cl.
*G06F 7/04* (2006.01)
*G06F 15/16* (2006.01)
*H04L 9/40* (2022.01)
*H04L 29/06* (2006.01)

(52) U.S. Cl.
CPC .................................. *H04L 63/108* (2013.01)

(58) Field of Classification Search
CPC ...................................................... H04L 63/108
USPC ............................................................. 726/4
See application file for complete search history.

(56) References Cited

U.S. PATENT DOCUMENTS

| | | | |
|---|---|---|---|
| 2016/0135154 A1* | 5/2016 | Klemanski | H04W 4/40 370/330 |
| 2020/0042920 A1* | 2/2020 | Moorthy | G06F 9/5061 |
| 2022/0398229 A1* | 12/2022 | Roy | G06F 16/958 |

* cited by examiner

*Primary Examiner* — Brandon Hoffman
*Assistant Examiner* — Samuel Ambaye
(74) *Attorney, Agent, or Firm* — Perkins Coie LLP

(57) ABSTRACT

Methods and systems are described herein for generating and assigning resources based on timestamps. A plurality of permission messages associated with a plurality of authorization events may be received with each permission message including an authorization timestamp indicating a generation time of a corresponding permission message. In addition, a plurality of data records may be received with each data record including a corresponding plurality of parameters. Based on the permission messages and the data records, a resource multiplier is generated, and resources assigned to each data record are multiplied based on the resource multiplier.

17 Claims, 7 Drawing Sheets

| Message ID | TimeStamp | Parameter 1 | Parameter 2 |
|---|---|---|---|
| 12 | 2023-09-25 18:45:30 | <Data_1> | <Data_2> |
| 13 | 2023-09-25 19:41:33 | <Data_1> | <Data_2> |
| 14 | 2023-09-25 21:31:13 | <Data_1> | <Data_2> |

FIG. 2

| Action ID | TimeStamp | Action Data |
|---|---|---|
| A_121 | 2023-09-26 8:45:30 | <Data_1> |
| A_122 | 2023-09-25 9:45:33 | <Data_1> |
| A_124 | 2023-09-25 8:21:13 | <Data_1> |

| Time Slot ID | Timing | Multiplier |
|---|---|---|
| 1 | F: 18:00 – S:6:00 | 6 |
| 2 | S:18:00 – Su:6:00 | 6 |
| 3 | S:12:00 – 3:00 | 3 |

FIG. 4

| Data Record ID | Parameters | Magnitude |
| --- | --- | --- |
| 1 | <Parameters> | <180> |
| 2 | <Parameters> | <600> |
| 3 | <Parameters> | <900> |

FIG. 5

GENERATING RESOURCES BASED ON TIMESTAMPS

BACKGROUND

With the advent of cloud computing, resource generation and allocation has become increasingly important. Cloud computing systems may include a large number of computing devices that have various combinations of memory, processors, disk space, etc. Those resources may be pre-allocated or allocated on-demand to hosted applications or tasks being performed in the cloud. Although cloud computing systems have vast resources to be allocated, those resources are still limited because of a large number of applications that now reside in the cloud. Accordingly, systems of assigning those resources to various tasks and applications have become more and more complex. In many instances, the assigned resources are not enough to efficiently execute an application or a workload.

SUMMARY

Accordingly, systems and methods are described herein for generating and assigning resources based on timestamps. A resource allocation system may be used for generating and assigning resources based on timestamps. The resource allocation system may receive a plurality of permission messages associated with a plurality of authorization events. Each permission message may include an authorization timestamp indicating a generation time of a corresponding permission message. For example, a permission message may be a request to allocate a particular amount of memory to an application or a task. The resource allocation system may approve the permission message and transmit the approval to the requesting system. In some embodiments, the resource allocation system may store a permission message and the approval for using the requested memory. Different applications may send different permission messages for approval of memory usage. In some embodiments, different permission messages may be received for allocating different resources (e.g., memory, processor(s), disk space, etc.).

Furthermore, the resource allocation system may receive a plurality of data records. Each data record may include a corresponding plurality of parameters. In some embodiments, the data records may be memory usage requests from different applications. Each data record may be generated by a system that received an approval in response to a permission message. Thus, each data record may be transmitted/received based on a permission message being approved by the resource authorization system.

When the data records are received, or as data records are received, the resource authorization system may generate and allocate the resources requested. In particular, the resource authorization system may generate, based on a first plurality of parameters associated with a first data record of the plurality of data records, a first magnitude of resources to be assigned to the first data record. For example, a first data record may be a request to use a particular amount of memory and/or processing power. Accordingly, the resource allocation system may generate a memory buffer of particular size and/or allocate processing power based on the amount of memory and/or processing power requested within the parameters of the first data record.

Before allocating the requested resources, the resource allocation system may determine whether the resource allocation has been authorized. In particular, the resource allocation system may determine, based on the first plurality of parameters, that the first data record matches a first permission message of the plurality of permission messages. For example, the resource allocation system may iterate through each permission message to determine which permission message matches a particular data record (e.g., which authorization for resources matches the request for resources).

When the resource allocation system identifies the matching permission message, the resource allocation system may determine whether to increase the resource allocation. In particular, the resource allocation system may retrieve a first timestamp associated with the first permission message. As discussed above, each permission message may have a corresponding timestamp indicating when the permission message was generated. Based on this timestamp, the resource allocation system may determine whether to increase the allocation of resources. In particular, the resource allocation system may determine, based on the first timestamp matching a predetermined time slot, a resource multiplier for the first data record. For example, if the permission message was generated during a time slot between 6:00 p.m. and 6:00 a.m., the resource allocation system may generate a multiplier for the amount of resources (e.g., amount of memory) requested.

In some embodiments, the resource allocation system may use the multiplier to increase the resource allocated. In particular, the resource allocation system may generate, based on the first magnitude and the resource multiplier, a second magnitude of resources. In some embodiments, the second magnitude of resources may be assigned to the first data record. For example, the resource allocation system may use the multiplier to determine a new amount of memory to be allocated within the memory buffer to a particular data record based on the timestamp associated with the permission message that corresponds to that data record.

In some embodiments, the resource allocation system may select a different multiplier to assign to the first data record based on the timestamp matching different time slots. For example, the resource allocation system may determine, based on the first timestamp matching a first predetermined time slot, a first resource multiplier for the first data record. Furthermore, the resource allocation system may determine, based on the first timestamp matching a second predetermined time slot, a second resource multiplier for the first data record. That is, the allocation system may iterate through each time slot and determine whether the timestamp matches one or more time slots. The resource allocation system may select a multiplier that matches a particular time slot.

In some embodiments, the resource allocation system may determine that the timestamp matches multiple time slots. For example, the first time slot may be between 6:00 p.m. and 6:00 a.m. and the second time slot may be between 9:00 p.m. and midnight. Accordingly, the resource allocation system may determine that both time slots match a 9:30 p.m. timestamp. In this case, the resource allocation system may combine the multiplier (e.g., add the multiplier, average the multipliers, etc.) based on predetermined criteria.

Various other aspects, features, and advantages of the system will be apparent through the detailed description and the drawings attached hereto. It is also to be understood that both the foregoing general description and the following detailed description are examples and not restrictive of the scope of the disclosure. As used in the specification and in the claims, the singular forms of "a," "an," and "the" include plural referents unless the context clearly dictates otherwise.

In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 2 illustrates an excerpt of a data structure representing a plurality of permission messages, in accordance with one or more embodiments of this disclosure.

FIG. 3 illustrates an excerpt of a data structure representing a plurality of data records, in accordance with one or more embodiments of this disclosure.

FIG. 4 illustrates an excerpt of a data structure storing representations of different time slots, in accordance with one or more embodiments of this disclosure.

FIG. 5 illustrates an excerpt of a data structure storing resource magnitudes generated based on applying a multiplier, in accordance with one or more embodiments of this disclosure.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
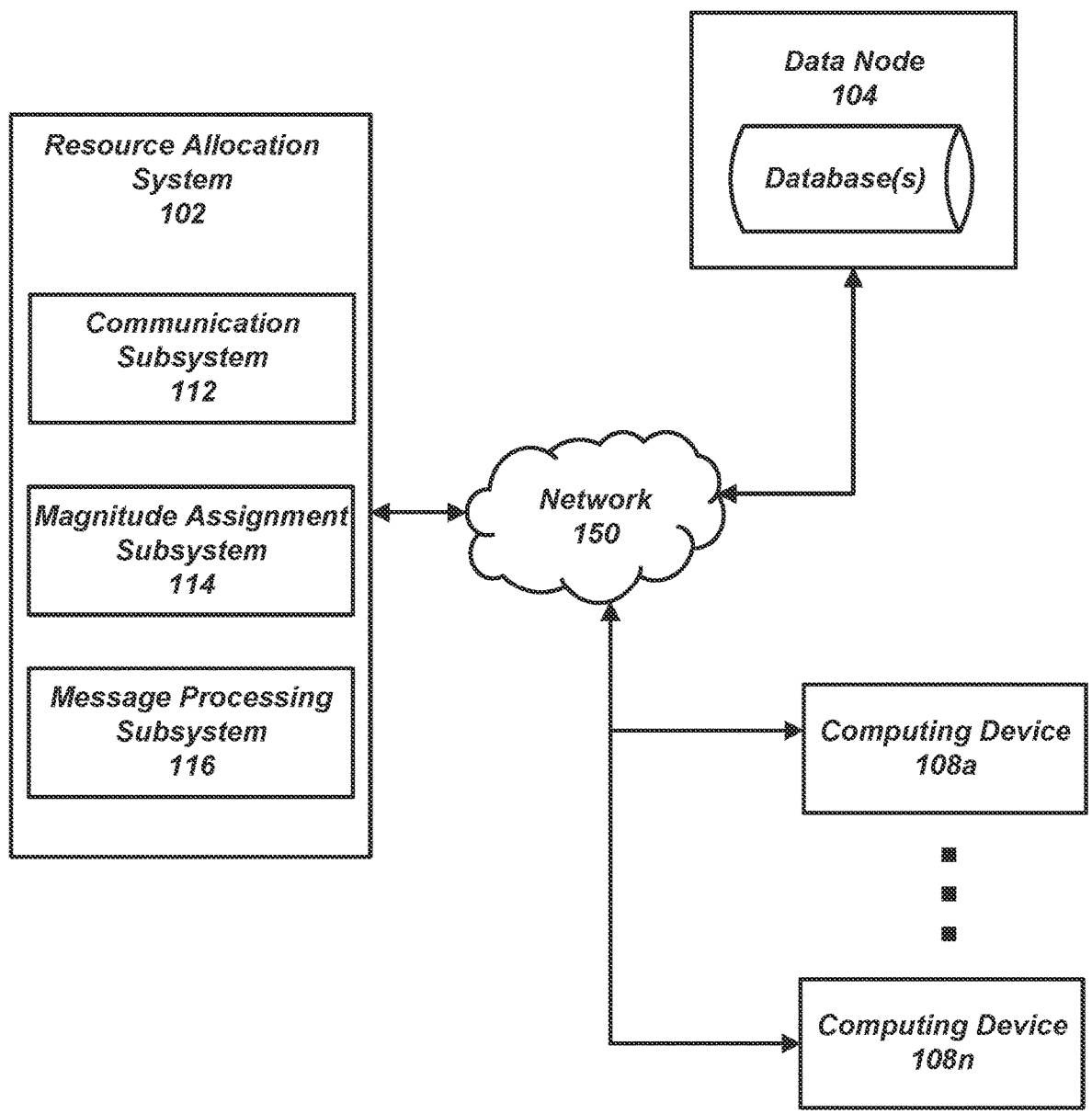
FIG. 1 shows an illustrative system for generating resources based on timestamps, in accordance with one or more embodiments of this disclosure.

FIG. 1 is an example of environment 100 for generating resources based on timestamps. Environment 100 includes resource allocation system 102, data node 104, and computing devices 108a-108n. Resource allocation system 102 may execute instructions for generating resources based on timestamps. Resource allocation system 102 may include software, hardware, or a combination of the two. For example, resource allocation system 102 may be hosted on a physical server or a virtual server that is running on a physical computer system. In some embodiments, resource allocation system 102 may be configured on a user device (e.g., a laptop computer, a smart phone, a desktop computer, an electronic tablet, or another suitable user device).

Data node 104 may store various data, including data records, received permission messages, time slot information, and/or other data. Data node 104 may include software, hardware, or a combination of the two. For example, data node 104 may be a physical server or a virtual server that is running on a physical computer system. In some embodiments, resource allocation system 102 and data node 104 may reside on the same hardware and/or the same virtual server/computing device. Network 150 may be a local area network (LAN), a wide area network (WAN) (e.g., the Internet), or a combination of the two. Computing devices 108a-108n may be end-user computing devices (e.g., desktop computers, laptops, electronic tablets, smart phones, and/or other computing devices used by end users) that may include microphone(s). In some embodiments, end-user devices may be transaction processing devices (e.g., in restaurants, bars, etc.) that are enabled to accept payments (e.g., credit card payments).

In addition to allocating cloud computing resources to applications/devices in the cloud, resource allocation system 102 may allocate credit card points based on purchases. For example, an entity may want to accelerate points for purchases at certain times of day. That is, the entity may want to assign points based on a user performing a particular action at a certain time of the day. This may be difficult because many transactions are settled (e.g., executed) at a different time and/or on a different day from when the user took a particular action (e.g., made a particular purchase). Accordingly, it is difficult to determine based on transaction data whether to accelerate points for a particular transaction. However, authorization data (e.g., data related to when an entity performs an authorization of a credit card during purchase) includes a timestamp representing an approximate time the actual user action took place and, thus, includes the timestamp needed to determine whether to accelerate points or to not accelerate points. Accordingly, resource allocation system 102 may use authorization timestamps to determine the real time of the transaction. However, before that determination is made, resource allocation system 102 has to match transaction data (e.g., a settled transaction) with authorization data (e.g., a record of the authorization of a credit card by a restaurant).

Accordingly, resource allocation system 102 may perform the following operations to allocate resources whether allocating cloud resources or allocating credit card points. Resource allocation system 102 may receive a plurality of permission messages associated with a plurality of authorization events (e.g., credit card authorizations). Each permission message of the plurality of permission messages may include an authorization timestamp (e.g., an authorization time) indicating a generation time of a corresponding permission message. Resource allocation system 102 may receive the permission messages using communication subsystem 112. Communication subsystem 112 may include software components, hardware components, or a combination of both. For example, communication subsystem 112 may include a network card (e.g., a wireless network card and/or a wired network card) that is associated with software to drive the card. In some embodiments, communication subsystem 112 may receive the permission messages from data node 104 or from another computing device. In some embodiments, communication subsystem 112 may receive the permission messages from one or more computing devices 108a-108n.

In some embodiments, the permissions messages may be requests to allocate memory to an application or a task. The resource allocation system may approve each permission message and transmit the approval to the requesting system. In some embodiments, the resource allocation system may store each permission message and the approval. Different applications may send different permission messages for approval of different resource usage. In some embodiments, the permission messages may be credit card authorizations being received from various restaurants, stores, and/or other places of business. For example, when a customer is paying for a restaurant bill, the customer may present a credit card that is swiped or has a chip that is used to create an authorization message for authorizing the card (e.g., determining that the card is valid for the transaction). That authorization message is sent to an authorizing entity. The credit card may then be authorized, and an approval sent back by the authorizing entity. Accordingly, the received authorization requests may be stored as permission messages that include a timestamp indicating a time that the authorization was requested (e.g., a time when the credit card was swiped). In some embodiments, the permission messages may be stored on data node 104 and sent to resource allocation system 102 at a particular time or at particular intervals.

Accordingly, resource allocation system 102 may receive (e.g., using communication subsystem 112) the permission messages. Thus, in some embodiments, the permission message may be associated with a plurality of actions such that each permission message of the plurality of permission messages authorizes a corresponding user action. For example, each permission message may be a credit card authorization requesting that a particular amount of payment is authorized. As discussed above, each permission message may include an authorization timestamp indicating a generation time of a corresponding permission message. FIG. 2 illustrates an excerpt of a data structure 200 representing a plurality of permission messages. Each permission message may include a message identifier shown in field 203. Field 206 may store a timestamp of when the permission was requested. Field 209 may store a first parameter associated with a corresponding permission message. For example, in a cloud computing context, the first parameter may store an amount of memory or processing power requested or another suitable value. Field 212 may include a second parameter for a corresponding permission message. The second parameter may be, for example, a type of memory or a type processing power requested. It should be noted that permission messages may include other parameters. For example, in a financial embodiment, each permission message may be a credit card authentication with the first parameter (field 209) being an amount to be authorized and a second parameter (field 212) being credit card number data for authorization.

Furthermore, communication subsystem 112 may receive a plurality of data records, such that each data record may include a corresponding plurality of parameters. In some embodiments, each corresponding plurality of parameters may be associated with the corresponding user action. As discussed above, the data records may be memory usage requests from different applications. Each data record may be generated by a system that received an approval in response to a permission message. Thus, each data record may be transmitted/received based on a permission message being approved by the resource authorization system. In some embodiments, the data records may be settled credit card transactions. For example, when a customer pays a restaurant bill with a credit card, a restaurant employee usually swipes the credit card for a credit card authorization (e.g., a permission message) that is sent to an authorizing entity that authorizes the credit card transaction. Once the credit card transaction is authorized, an authorization is sent back to the restaurant. When the authorization is received, a restaurant employee generates a bill and gives that bill to a customer who then proceeds to add a tip amount and sign the bill. That transaction may not be settled until the next day or later when the restaurant submits credit card transactions for settlement. Thus, settled transactions may not be received until the next day. Thus, data records may correspond to settled transactions while permission messages may correspond to authorization requests, as described above.

FIG. 3 illustrates an excerpt of a data structure 300 representing a plurality of data records. Field 303 may include an action identifier with field 306 storing a timestamp corresponding to a time when a particular data record was received. For example, a timestamp may be a time when a credit card transaction was settled, which may be hours or days after the actual transaction occurred. Field 309 may include action data. In the financial example, action data may include credit card number data, transaction amount data, and/or other suitable data.

When the data records and/or permission messages are received, communication subsystem 112 may pass the data records and/or permissions messages, or a pointer to the permission messages in memory, to magnitude assignment subsystem 114. Magnitude assignment subsystem 114 may include software components, hardware components, or a combination of both. For example, magnitude assignment subsystem 114 may include software components that access one or more databases (e.g., on data node 104) to retrieve magnitude data for assigning magnitudes to database entries. Accordingly, magnitude assignment subsystem 114 may generate, based on a first plurality of parameters associated with a first data record of the plurality of data records, a first magnitude of resources to be assigned to the first data record. For example, a first data record may be a request to use a particular amount of memory and/or processing power. Accordingly, magnitude assignment subsystem 114 may generate a memory buffer of particular size and/or allocate processing power based on the amount of memory and/or processing power requested within the parameters of the first data record. In a financial example, magnitude assignment subsystem 114 may assign a number of credit card points earned with the transaction based on the settled transaction. For example, if the settled transaction indicates that a customer spent one hundred dollars, magnitude assignment subsystem 114 may assign one hundred points to that data record (e.g., to that settled transaction).

In some embodiments, magnitude assignment subsystem 114 may generate the magnitudes for all or some received data records before sending a notification to message processing subsystem 116 that magnitudes have been assigned. However, in some embodiments, magnitude assignment subsystem 114 may send an indication to message processing subsystem 116 that a particular data record has now an assigned magnitude. Message processing subsystem 116 may include software components, hardware components, or a combination of both. For example, message processing subsystem 116 may include software components that access one or more memory locations for processing permissions messages as they relate to the data records.

Accordingly, message processing subsystem 116 may determine, based on the first plurality of parameters, that the first data record matches a first permission message of the plurality of permission messages. For example, message processing subsystem 116 may iterate through each data record and identify a corresponding permission message for that data record. In some embodiments, message processing subsystem 116 may use parameters corresponding to the permission messages in combination with parameters associated with the data records for matching permissions messages to data records. In some embodiments, message processing subsystem 116 may use credit card information in combination with other data within the permission messages to match those permission messages with credit card data within the data records. Accordingly, message processing subsystem 116 may determine for each permission message a corresponding data record.

As discussed above, the timestamp with a particular permission message may be different from a timestamp of the corresponding data record. Thus, communication subsystem 112 may receive the plurality of data records such that each data record may be received with a corresponding plurality of parameters, with each plurality of parameters including a corresponding authorization timestamp that is different from a corresponding timestamp associated with the corresponding permission message.

When the permission messages are matched to corresponding data records, message processing subsystem 116 may determine a multiplier for the resources. In particular, message processing subsystem 116 may retrieve a first timestamp associated with the first permission message. In some embodiments, message processing subsystem 116 may iterate through each data record and access, for each data record, a corresponding permission message. Message processing subsystem 116 may then retrieve a timestamp from the corresponding permission message. It should be noted that the timestamp within the permission message is a different timestamp from any timestamp within the data record. For example, message processing subsystem 116 may match credit card authorizations to settled credit card transactions so that timestamps may be retrieved from the credit card authorization data and used to assign credit card points or accelerated points based on settled transactions.

For each data record, when message processing subsystem 116 retrieves the timestamp from the corresponding permission message, message processing subsystem 116 may determine whether the timestamp matches a particular time slot that indicates that the magnitude described above is to be multiplied. Thus, message processing subsystem 116 may determine, based on the first timestamp matching a predetermined time slot, a resource multiplier for the first data record. For example, message processing subsystem 116 may retrieve a plurality of time slots stored in a database (e.g., a database on data node 104) and compare the retrieved timestamp to each time slot. When message processing subsystem 116 determines that the timestamp indicates a time within a time slot, message processing subsystem 116 may identify a multiplier associated with that time slot. For example, message processing subsystem 116 may determine whether the credit card transaction, based on the authorization timestamp, matches a time period for accelerating reward points.

FIG. 4 illustrates an excerpt of a data structure 400 storing representations of different time slots. Field 403 may store a time slot identifier which may be, for example, a number, an alphanumeric string, or another suitable identifier. Field 406 may store definitions of corresponding time slots. The definition may include a particular day and time of the week (e.g., for weekly time slots), a particular time (e.g., for daily time slots), days of the months (e.g., for monthly time slots), and/or other suitable definitions. Field 409 may store a corresponding multiplier. For example, a time slot with an identifier of one may indicate that between each Friday 6:00 p.m. and Saturday 6:00 a.m. the magnitude is to be multiplied by six.

Accordingly, in some embodiments, message processing subsystem 116 may determine, based on the first timestamp matching a first predetermined time slot, a first resource multiplier for the first data record, or message processing subsystem 116 may determine, based on the first timestamp matching a second predetermined time slot, a second resource multiplier for the first data record. For example, as message processing subsystem 116 iterates through data records, message processing subsystem 116 may identify one time slot that matches the timestamp (e.g., the timestamp has a day/time that is within the time slot). For example, message processing subsystem 116 may assign different number of reward points based on different time slots. For example, six times the regular reward points may be assigned between the hours of 6:00 PM and 6:00 AM.

In some embodiments, message processing subsystem 116 may perform the following operations when determining a resource multiplier for a particular data record. Message processing subsystem 116 may retrieve corresponding time data for a plurality of time slots. The plurality of time slots may be associated with one or more resource multipliers. For example, message processing subsystem 116 may retrieve (e.g., from data node 104) a data structure that stores time slot information (e.g., as shown in FIG. 4). Once the time slot information is retrieved, message processing subsystem 116 may use field 406 for matching the timestamp with a time slot.

Furthermore, message processing subsystem 116 may compare the first timestamp associated with the first permission message with the corresponding time data of each time slot of the plurality of time slots. For example, message processing subsystem 116 may retrieve a timestamp from a credit card authorization (permission message) that corresponds to a particular settled transaction (data record). In addition, message processing subsystem 116 may retrieve time slot information (e.g., from field 406) and iterate through each time slot to compare the timestamp with time data associated with each time slot. For example, message processing subsystem 116 may determine whether the credit card authorization was received during one or more times when reward points are to be accelerated.

Message processing subsystem 116 may then determine, based on comparing the first timestamp associated with the first permission message with the corresponding time data of each time slot of the plurality of time slots, a first time slot that matches the first timestamp. For example, as message processing subsystem 116 iterates through each time slot, message processing subsystem 116 may identify a matching time slot. In some embodiments, when message processing subsystem 116 identifies a matching time slot, message processing subsystem 116 may stop iterating through other time slots. However, in some embodiments, message processing subsystem 116 may continue the iteration process and may match multiple time slots to the timestamps. For example, two or more time slots may have overlapping times. Accordingly, message processing subsystem 116 may match multiple time slots. In a financial example, a particular time slot may be a weekend time slot (e.g., between Friday 6:00 p.m. and Sunday 11:59 p.m.). Another time slot may be a Saturday night time slot (e.g., between Saturday 6:00 p.m. and Saturday 11:59 p.m.). Thus, if a particular timestamp indicates Saturday at 7:00 p.m., that timestamp may match both time slots.

Message processing subsystem 116 may then retrieve, from a data structure associated with the first time slot, the resource multiplier associated with the first time slot. For example, message processing subsystem 116 may access a data structure (e.g., as shown in FIG. 4) and retrieve a multiplier corresponding to the matching time slot. In some embodiments, if multiple time slots are matching, message processing subsystem 116 may retrieve multiple multipliers. In some embodiments, message processing subsystem 116 may perform the following actions when there is no matching time slot. Message processing subsystem 116 may determine that the first timestamp does not match any time slot of the plurality of time slots and, based on determining that the first timestamp does not match any time slot of the plurality of time slots, generate the resource multiplier that does not increase the first magnitude. For example, message processing subsystem 116 may determine that the credit card authorization was submitted at a time when there was no available point multiplier. Accordingly, message processing subsystem 116 may set the multiplier to a null value indicating that the points should not be multiplied. In some embodiments, message processing subsystem 116 may set the multiplier to a value of one.

As discussed above, in some embodiments, message processing subsystem 116 may determine that the timestamp matches multiple time slots. Accordingly, message processing subsystem 116 may perform the following operations when multiple time slots are matched. Message processing subsystem 116 may determine, based on the first timestamp matching a different predetermined time slot, a different resource multiplier for the first data record. For example, message processing subsystem 116 may apply a conversion operation to the multipliers of the matching time slots. For example, if the first multiplier is six and the second multiplier is eight, message processing subsystem 116 may average those multipliers to arrive at the final multiplier. In some embodiments, those multipliers may be weighted based on the amount of resources within the parameters of the data records associated with the multipliers. In a financial example, the parameter at issue may be a number of dollars spent. Thus, the multiplier associated with a greater amount of dollars spent may get more weight, proportionally. Once the multiplier is determined, message processing subsystem 116 may generate, based on the different resource multiplier, a third magnitude of resources to assign to the first data record.

In some embodiments, message processing subsystem 116 may use additional criteria for determining a multiplier. For example, message processing subsystem 116 may use an authentication request type as additional criteria. Thus, message processing subsystem 116 may retrieve, from the first data record, an authentication request type associated with the first data record. The authentication request type may be one of a plurality of authentication request types. For example, an authentication request type may correspond to a type of entity where the transaction was performed. Some entity types may be bars, restaurants, electronics stores, web stores, grocery stores, gas stations, etc. Thus, each data record may include a parameter indicating a type. Other criteria may be used in addition to the timing that may be set based on the parameters of a permission message and/or data record (e.g., entity location, type of product purchases, and/or other parameters). Thus, message processing subsystem 116 may determine the resource multiplier based on both the authentication request type and the first timestamp matching any time slot of the plurality of time slots.

In some embodiments, the additional criteria may be a regular expression. For example, the additional criteria may require that the purchase had to be in a physical store that is located in a particular city, but that the purchased product was not a food item. Furthermore, the multiplier may be updated based on the criteria. For example, if the location matches, a particular value may be added to the multiplier. However, if the type of product does not match a particular value may be subtracted from the multiplier. Thus, message processing subsystem 116 may determine the resource multiplier based on both the additional criteria (e.g., the regular expression) and the first timestamp matching any time slot of the plurality of time slots.

When the multiplier has been determined, message processing subsystem 116 may generate, based on the first magnitude and the resource multiplier, a second magnitude of resources. The second magnitude of resources may then be assigned to the first data record. For example, message processing subsystem 116 may retrieve the first magnitude determined based on the parameters of the first data record and apply the multiplier to the first magnitude. In some embodiments, the first magnitude may correspond to a number of points that were assigned to a transaction (e.g., based on an amount spent) and that number of points may be multiplied by a multiplier to arrive at the second magnitude. Thus, the multiplier may be a points accelerator determined based on authorization time and/or other criteria.

Figure 5:
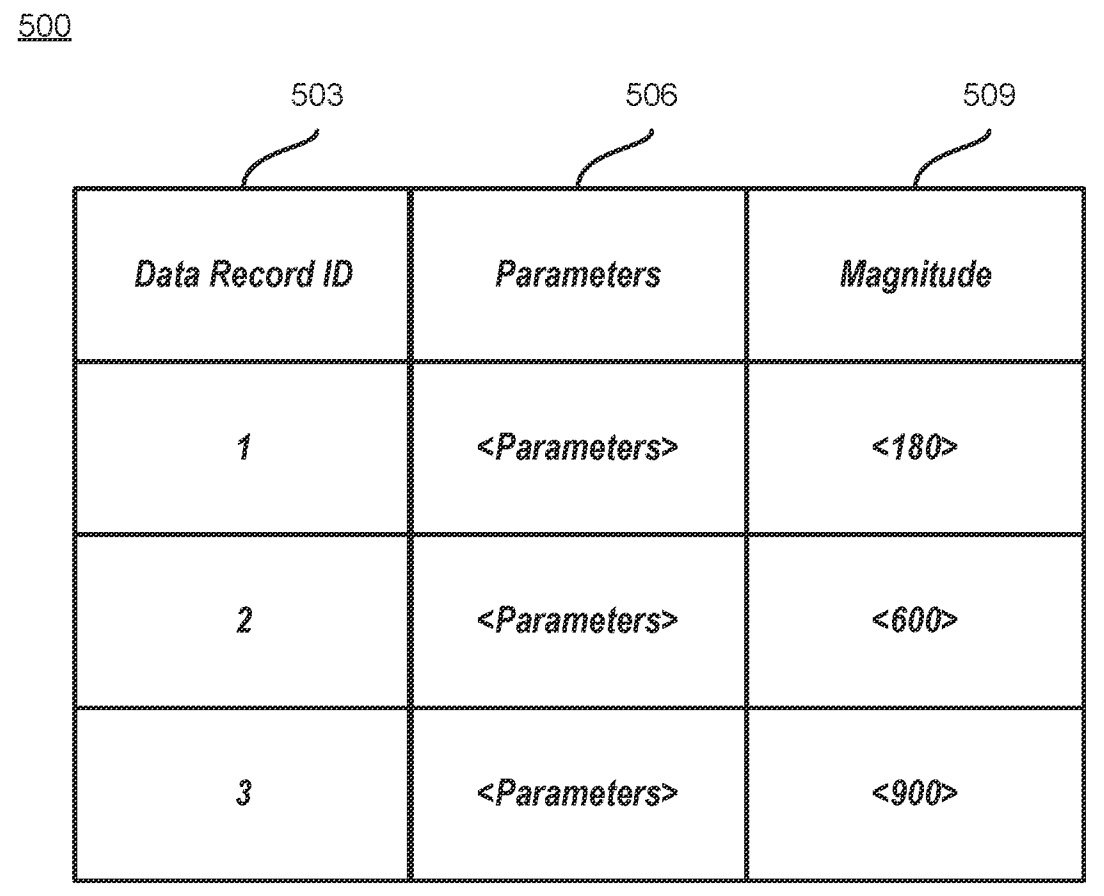

FIG. 5 illustrates an excerpt of a data structure 500 storing resource magnitudes generated based on applying a multiplier. Field 503 may store a data record identifier. A data record identifier may be a number, a string, or another suitable identifier. Field 506 may store one or more data record parameters (e.g., as described above). Field 509 may store a magnitude. In some embodiments, field 509 may store the first magnitude that is generated based on the data record parameters and may then be updated with a second magnitude generated based on the multiplier, as described above. In some embodiments, data structure 500 may, alternatively or additionally, include a multiplier as discussed above.

In some embodiments, resource allocation system 102 may accelerate the magnitude further based on a number of data records that match a particular time slot. In particular, message processing subsystem 116 may determine a subset of the plurality of data records with corresponding timestamps within the first predetermined time slot. For example, a first data record may match a particular time slot. In response, message processing subsystem 116 may identify other data records that match the same time slot. Message processing subsystem 116 may perform the identification operation by iterating through all the data records and determining, based on corresponding timestamps within the matching permission messages, time slots that match those data records.

Message processing subsystem 116 may then modify the first resource multiplier based on the one or more parameters of data records within the subset. For example, message processing subsystem 116 may determine that there are three other transactions that match a particular time slot. Accordingly, message processing subsystem 116 may add three to the current multiplier. In some embodiments, message processing subsystem 116 may use a formula to compute the additional multiplier value. The formula may take into account various parameters within the data records and/or corresponding permission messages.

Computing Environment

Figure 6:
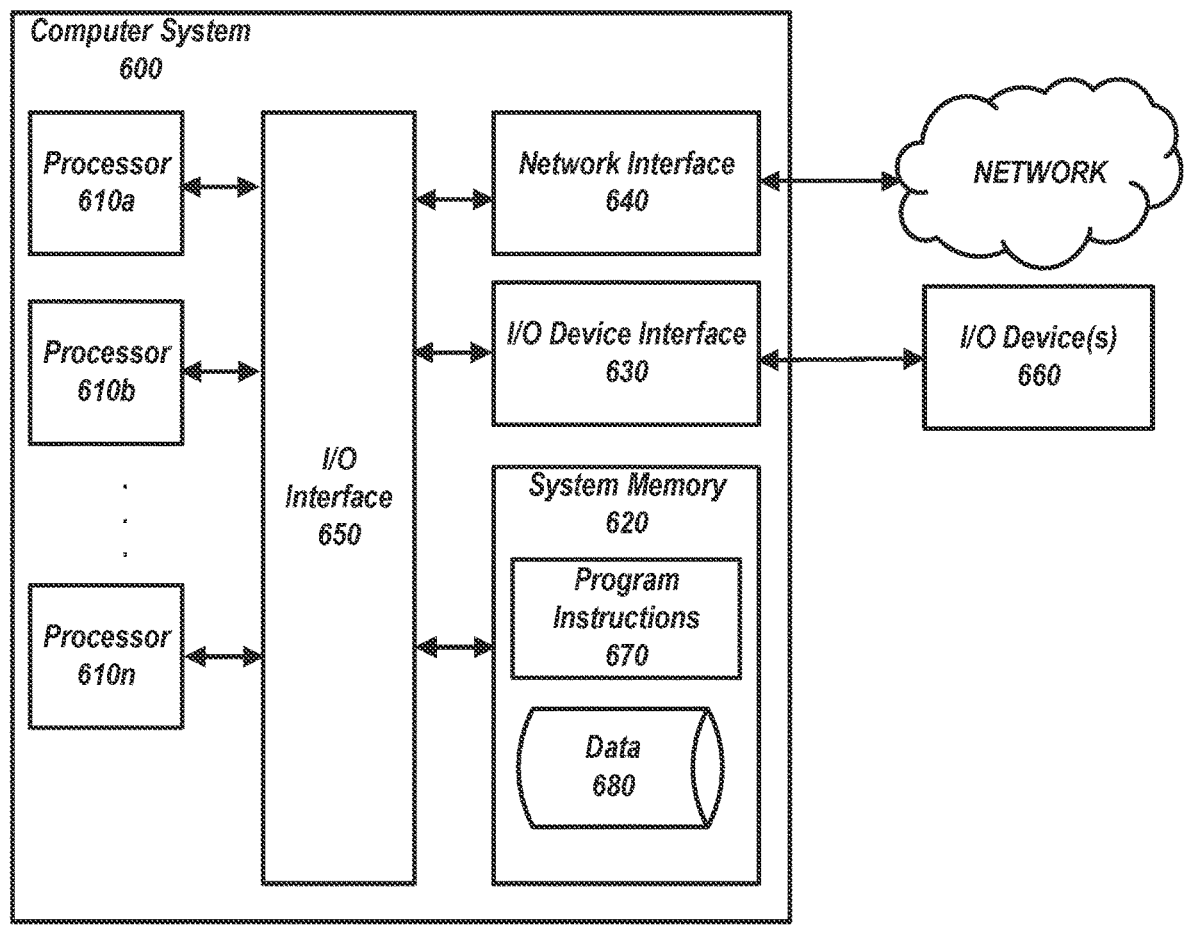
FIG. 6 illustrates a computing device, in accordance with one or more embodiments of this disclosure.

FIG. 6 shows an example computing system that may be used in accordance with some embodiments of this disclosure. In some instances, computing system 600 is referred to as a computer system 600. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610a-610n) coupled to system memory 620, an input/output (I/O) device interface 630, and a network interface 640 via an I/O interface 650. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610a) or a multi-processor system including any number of suitable processors (e.g., 610a-610n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computer system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computer system 600 through a wired or wireless connection. I/O devices 660 may be connected to computer system 600 from a remote location. I/O devices 660 located on remote computer systems, for example, may be connected to computer system 600 via a network and network interface 640.

Network interface 640 may include a network adapter that provides for connection of computer system 600 to a network. Network interface 640 may facilitate data exchange between computer system 600 and other devices connected to the network. Network interface 640 may support wired or wireless communication. The network may include an electronic communication network, such as the Internet, an LAN, a WAN, a cellular communications network, or the like.

System memory 620 may be configured to store program instructions 670 or data 680. Program instructions 670 may be executable by a processor (e.g., one or more of processors 610a-610n) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 620 may include a tangible program carrier having program instructions stored thereon. A tangible program carrier may include a non-transitory, computer-readable storage medium. A non-transitory, computer-readable storage medium may include a machine-readable storage device, a machine-readable storage substrate, a memory device, or any combination thereof. A non-transitory, computer-readable storage medium may include non-volatile memory (e.g., flash memory, ROM, PROM, EPROM, EEPROM memory), volatile memory (e.g., random access memory (RAM), static RAM (SRAM), synchronous dynamic RAM (SDRAM)), bulk storage memory (e.g., CD-ROM and/or DVD-ROM, hard drives), or the like. System memory 620 may include a non-transitory, computer-readable storage medium that may have program instructions stored thereon that are executable by a computer processor (e.g., one or more of processors 610a-610n) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610a-610n, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610a-610n). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 600 or multiple computer systems 600 configured to host different portions or instances of embodiments. Multiple computer systems 600 may provide for parallel or sequential processing/execution of one or more portions of the techniques described herein.

Those skilled in the art will appreciate that computer system 600 is merely illustrative and is not intended to limit the scope of the techniques described herein. Computer system 600 may include any combination of devices or software that may perform or otherwise provide for the performance of the techniques described herein. For example, computer system 600 may include or be a combination of a cloud computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 600 may also be connected to other devices that are not illustrated or may operate as a stand-alone system. In addition, the functionality provided by the illustrated components may, in some embodiments, be combined in fewer components or distributed in additional components. Similarly, in some embodiments, the functionality of some of the illustrated components may not be provided, or other additional functionality may be available.

Operation Flow

Figure 7:
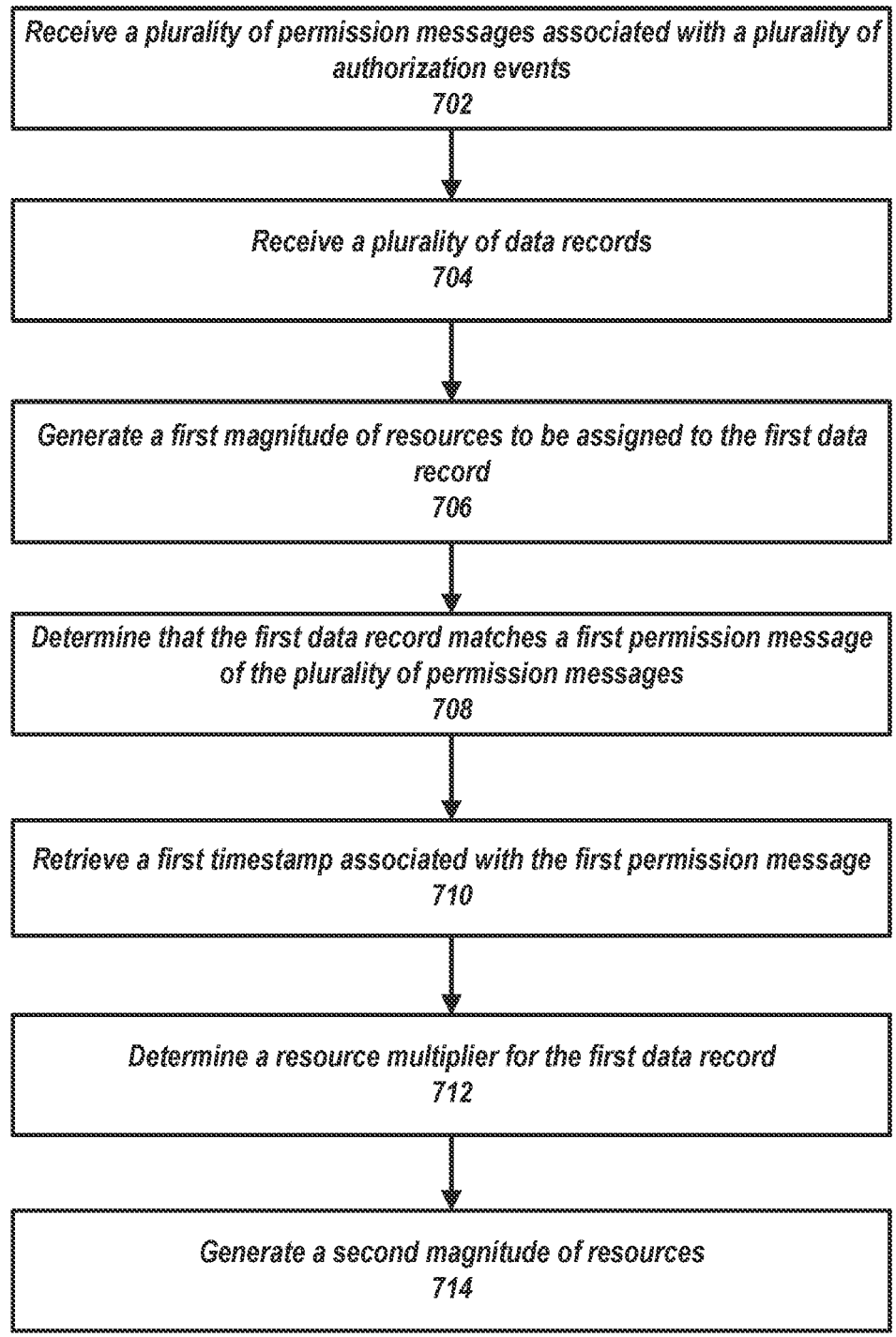
FIG. 7 is a flowchart of operations for generating resources based on timestamps, in accordance with one or more embodiments of this disclosure.

FIG. 7 is a flowchart 700 of operations for generating vehicle profiles for generating and assigning resources based on timestamps. The operations of FIG. 7 may use components described in relation to FIG. 6. In some embodiments, resource allocation system 102 may include one or more components of computer system 600. At 702, resource allocation system 102 receives a plurality of permission messages associated with a plurality of authorization events. For example, resource allocation system 102 may receive the permission messages from data node 104 and/or from one or more computing devices 108a-108n. Resource allocation system 102 may receive the permission messages over network 150 using network interface 640. At 704, resource allocation system 102 may receive a plurality of data records. Resource allocation system 102 may receive the data records from data node 104 and/or from one or more computing devices 108a-108n. Resource allocation system 102 may receive the data records over network 150 using network interface 640.

At 706, resource allocation system 102 generates a first magnitude of resources to be assigned to the first data record. For example, resource allocation system 102 may use one or more processors 610a-610n to perform the operation and store the results in system memory 620. At 708, resource allocation system 102 determines that the first data record matches a first permission message of the plurality of permission messages. For example, resource allocation system 102 may use one or more processors 610a-610n to perform the operation and store the results in system memory 620.

At 710, resource allocation system 102 retrieves a first timestamp associated with the first permission message. For example, resource allocation system 102 may use one or more processors 610a-610n to perform the operation. Resource allocation system 102 may retrieve the timestamp from a permission message in memory or from a database (e.g., a database stored on data node 104). At 712, resource allocation system 102 determines a resource multiplier for the first data record. For example, resource allocation system 102 may use one or more processors 610a-610n to perform the operation and store the results in system memory 620. At 714, resource allocation system 102 generates a second magnitude of resources. For example, resource allocation system 102 may use one or more processors 610a-610n to perform the operation and store the results in system memory 620. Resource allocation system 102 may assign the second magnitude of resources to the first data record using one or more processors 610a-610n.

Although the present invention has been described in detail for the purpose of illustration based on what is currently considered to be the most practical and preferred embodiments, it is to be understood that such detail is solely for that purpose and that the invention is not limited to the disclosed embodiments but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for generating resources based on timestamps, the method comprising: receiving a plurality of permission messages associated with a plurality of authorization events, wherein each permission message of the plurality of permission messages comprises an authorization timestamp indicating a generation time of a corresponding permission message; receiving a plurality of data records, wherein each data record comprises a corresponding plurality of parameters; generating, based on a first plurality of parameters associated with a first data record of the plurality of data records, a first magnitude of resources to be assigned to the first data record; determining, based on the first plurality of parameters, that the first data record matches a first permission message of the plurality of permission messages; retrieving a first timestamp associated with the first permission message; determining, based on the first timestamp matching a predetermined time slot, a resource multiplier for the first data record; and generating, based on the first magnitude and the resource multiplier, a second magnitude of resources, wherein the second magnitude of resources is assigned to the first data record.

2. Any of the preceding embodiments, wherein determining the resource multiplier for the first data record further comprises: retrieving corresponding time data for a plurality of time slots, wherein the plurality of time slots is associated with one or more resource multipliers; comparing the first timestamp associated with the first permission message with the corresponding time data of each time slot of the plurality of time slots; determining, based on comparing the first timestamp associated with the first permission message with the corresponding time data of each time slot of the plurality of time slots, a first time slot that matches the first timestamp; and retrieving, from a data structure associated with the first time slot, the resource multiplier associated with the first time slot.

3. Any of the preceding embodiments, wherein determining the resource multiplier for the first data record further comprises: determining that the first timestamp does not match any time slot of the plurality of time slots; and, based on determining that the first timestamp does not match any time slot of the plurality of time slots, generating the resource multiplier that does not increase the first magnitude.
4. Any of the preceding embodiments, wherein determining the resource multiplier for the first data record further comprises: retrieving, from the first data record, an authentication request type associated with the first data record, wherein the authentication request type is one of a plurality of authentication request types; and determining the resource multiplier based on both the authentication request type and the first timestamp matching any time slot of the plurality of time slots.
5. Any of the preceding embodiments, wherein receiving the plurality of data records comprises receiving for each data record the corresponding plurality of parameters, wherein each plurality of parameters comprises a corresponding authorization timestamp that is different from a corresponding timestamp associated with the corresponding permission message.
6. Any of the proceeding embodiments, further comprising: determining a subset of the plurality of data records with corresponding timestamps within the predetermined time slot; and modifying the first resource multiplier based on the one or more parameters of data records within the subset.
7. Any of the preceding embodiments, further comprising: determining, based on the first timestamp matching a different predetermined time slot, a different resource multiplier for the first data record; and generating, based on the different resource multiplier, a third magnitude of resources to assign to the first data record.
8. A tangible, non-transitory, machine-readable medium storing instructions that, when executed by a data processing apparatus, cause the data processing apparatus to perform operations comprising those of any of embodiments 1-7.
9. A system comprising: one or more processors; and memory storing instructions that, when executed by the processors, cause the processors to effectuate operations comprising those of any of embodiments 1-7.
10. A system comprising means for performing any of embodiments 1-7.
11. A system comprising cloud-based circuitry for performing any of embodiments 1-7.

What is claimed is:
1. A system for generating resources based on timestamps, the system comprising:
one or more processors; and
one or more memories configured to store instructions that when executed by the one or more processors perform operations comprising:
receiving a plurality of permission messages associated with a plurality of actions, wherein each permission message of the plurality of permission messages authorizes a corresponding user action, and wherein each permission message comprises an authorization timestamp indicating a generation time of a corresponding permission message;
receiving a plurality of data records, wherein each data record comprises a corresponding plurality of parameters, wherein each corresponding plurality of parameters is associated with the corresponding user action;
generating, based on a first plurality of parameters associated with a first data record of the plurality of data records, a first magnitude of resources to be assigned to the first data record;
determining, based on the first plurality of parameters, that the first data record matches a first permission message of the plurality of permission messages;
retrieving a first timestamp associated with the first permission message;
retrieving corresponding time data for a plurality of time slots, wherein the plurality of time slots is associated with one or more resource multipliers;
comparing the first timestamp associated with the first permission message with the corresponding time data of each time slot of the plurality of time slots;
determining, based on comparing the first timestamp associated with the first permission message with the corresponding time data of each time slot of the plurality of time slots, a first predetermined time slot that matches the first timestamp;
retrieving, from a data structure associated with the first predetermined time slot, a first resource multiplier associated with the first predetermined time slot; and
generating, based on the first magnitude and the first resource multiplier, a second magnitude of resources, wherein the second magnitude of resources is assigned to the first data record.

2. The system of claim 1, wherein the instructions for determining the first resource multiplier for the first data record further cause the one or more processors to perform operations comprising:
determining that the first timestamp does not match any time slot of the plurality of time slots; and
based on determining that the first timestamp does not match any time slot of the plurality of time slots, generating the first resource multiplier that does not increase the first magnitude.

3. The system of claim 1, wherein the instructions for determining the first resource multiplier for the first data record further cause the one or more processors to perform operations comprising:
retrieving, from the first data record, an authentication request type associated with the first data record, wherein the authentication request type is one of a plurality of authentication request types; and
determining the first resource multiplier based on both the authentication request type and the first timestamp matching any time slot of the plurality of time slots.

4. The system of claim 1, wherein the instructions for receiving the plurality of data records further cause the one or more processors to receive for each data record the corresponding plurality of parameters, wherein each plurality of parameters comprises a completion timestamp that is different from a corresponding authorization timestamp associated with a matching permission message.

5. The system of claim 1, wherein the instructions further cause the one or more processors to perform operations comprising:
determining a subset of the plurality of data records with corresponding timestamps within the first predetermined time slot; and
modifying the first resource multiplier based on one or more parameters of data records within the subset.

6. A method for generating resources based on timestamps, the method comprising:
receiving a plurality of permission messages associated with a plurality of authorization events, wherein each permission message of the plurality of permission messages comprises an authorization timestamp indicating a generation time of a corresponding permission message;

receiving a plurality of data records, wherein each data record comprises a corresponding plurality of parameters;

generating, based on a first plurality of parameters associated with a first data record of the plurality of data records, a first magnitude of resources to be assigned to the first data record;

determining, based on the first plurality of parameters, that the first data record matches a first permission message of the plurality of permission messages;

retrieving a first timestamp associated with the first permission message;

retrieving corresponding time data for a plurality of time slots, wherein the plurality of time slots is associated with one or more resource multipliers;

comparing the first timestamp associated with the first permission message with the corresponding time data of each time slot of the plurality of time slots;

determining, based on comparing the first timestamp associated with the first permission message with the corresponding time data of each time slot of the plurality of time slots, a predetermined time slot that matches the first timestamp;

retrieving, from a data structure associated with the predetermined time slot, a resource multiplier associated with the predetermined time slot; and generating, based on the first magnitude and the resource multiplier, a second magnitude of resources, wherein the second magnitude of resources is assigned to the first data record.

7. The method of claim 6, wherein determining the resource multiplier for the first data record further comprises:

determining that the first timestamp does not match any time slot of the plurality of time slots; and based on determining that the first timestamp does not match any time slot of the plurality of time slots, generating the resource multiplier that does not increase the first magnitude.

8. The method of claim 6, wherein determining the resource multiplier for the first data record further comprises:

retrieving, from the first data record, an authentication request type associated with the first data record, wherein the authentication request type is one of a plurality of authentication request types; and determining the resource multiplier based on both the authentication request type and the first timestamp matching any time slot of the plurality of time slots.

9. The method of claim 6, wherein receiving the plurality of data records comprises receiving for each data record the corresponding plurality of parameters, wherein each plurality of parameters comprises a corresponding authorization timestamp that is different from a corresponding timestamp associated with the corresponding permission message.

10. The method of claim 6, further comprising:

determining a subset of the plurality of data records with corresponding timestamps within the predetermined time slot; and modifying the resource multiplier based on one or more parameters of data records within the subset.

11. The method of claim 6, further comprising:

determining, based on the first timestamp matching a different predetermined time slot, a different resource multiplier for the first data record; and generating, based on the different resource multiplier, a third magnitude of resources to assign to the first data record.

12. One or more non-transitory, computer-readable media storing instructions that when executed by one or more processors perform operations comprising:

receiving a plurality of permission messages associated with a plurality of authorization events, wherein each permission message of the plurality of permission messages comprises an authorization timestamp indicating a generation time of a corresponding permission message;

receiving a plurality of data records, wherein each data record comprises a corresponding plurality of parameters;

generating, based on a first plurality of parameters associated with a first data record of the plurality of data records, a first magnitude of resources to be assigned to the first data record;

determining, based on the first plurality of parameters, that the first data record matches a first permission message of the plurality of permission messages;

retrieving a first timestamp associated with the first permission message;

retrieving corresponding time data for a plurality of time slots, wherein the plurality of time slots is associated with one or more resource multipliers;

comparing the first timestamp associated with the first permission message with the corresponding time data of each time slot of the plurality of time slots;

determining, based on comparing the first timestamp associated with the first permission message with the corresponding time data of each time slot of the plurality of time slots, a predetermined time slot that matches the first timestamp;

retrieving, from a data structure associated with the predetermined time slot, a resource multiplier associated with the predetermined time slot; and generating, based on the first magnitude and the resource multiplier, a second magnitude of resources, wherein the second magnitude of resources is assigned to the first data record.

13. The one or more non-transitory, computer-readable media of claim 12, wherein the instructions for determining the resource multiplier for the first data record further cause the one or more processors to:

determine that the first timestamp does not match any time slot of the plurality of time slots; and based on determining that the first timestamp does not match any time slot of the plurality of time slots, generate the resource multiplier that does not increase the first magnitude.

14. The one or more non-transitory, computer-readable media of claim 12, wherein the instructions for determining the resource multiplier for the first data record further cause the one or more processors to:

retrieve, from the first data record, an authentication request type associated with the first data record, wherein the authentication request type is one of a plurality of authentication request types; and determine the resource multiplier based on both the authentication request type and the first timestamp matching any time slot of the plurality of time slots.

15. The one or more non-transitory, computer-readable media of claim 12, wherein the instructions for receiving the plurality of data records cause the one or more processors to receive for each data record the corresponding plurality of parameters, wherein each plurality of parameters comprises a corresponding authorization timestamp that is different from a corresponding timestamp associated with the corresponding permission message.

16. The one or more non-transitory, computer-readable media of claim 12, wherein the instructions further cause the one or more processors to:
   determine a subset of the plurality of data records with corresponding timestamps within the predetermined time slot; and
   modify the resource multiplier based on one or more parameters of data records within the subset.

17. The one or more non-transitory, computer-readable media of claim 12, wherein the instructions further cause the one or more processors to:
   determine, based on the first timestamp matching a different predetermined time slot, a different resource multiplier for the first data record; and
   generate, based on the different resource multiplier, a third magnitude of resources to assign to the first data record.

* * * * *